United States Patent [19]

Elzy

[11] Patent Number: 4,733,020

[45] Date of Patent: Mar. 22, 1988

[54] DIELECTRIC UTILITY CABLE GUARD

[75] Inventor: Carl T. Elzy, Newbury Park, Calif.

[73] Assignee: General Telephone Company of California, Thousand Oaks, Calif.

[21] Appl. No.: 50,653

[22] Filed: May 18, 1987

[51] Int. Cl.⁴ .......................... H02G 3/04; H02G 3/26
[52] U.S. Cl. .................................... 174/136; 138/109;
 174/45 R; 174/68 C
[58] Field of Search ................. 174/45 R, 68 C, 70 C,
 174/136; 285/64, 177; 138/109

[56] References Cited

U.S. PATENT DOCUMENTS 3,349,805 10/1967 Fried ................................ 285/177 X
3,580,982 5/1971 Havewala ......................... 174/45 R

FOREIGN PATENT DOCUMENTS 633365 12/1949 United Kingdom .............. 174/68 C

Primary Examiner—Laramie E. Askin
Attorney, Agent, or Firm—Douglas M. Gilbert

[57] ABSTRACT

An electrically nonconductive utility cable guard for use in protecting electrical riser cables from vandalism and rodent damage. The cable guard is a U-shaped open-ended channel formed of a reinforced synthetic resin material having an overall thickness of from ¼" to ⅜". Molded to the outer edge of each side portion of the channel are short mounting tabs having apertures therein for mounting the guard to an accommodating surface such as a utility pole. In one embodiment the tabs extend from the side walls at an angle of 105°. The cable guard neatly mates with underground conduit extensions due to a novel footing integrally molded to one end of the channel. The footing uses a plurality of stepped lips extending axially and radially away from the channel to mate with the ends of conduit of various sizes.

12 Claims, 3 Drawing Figures

DIELECTRIC UTILITY CABLE GUARD

BACKGROUND OF THE INVENTION

1. Field of the Invention

The present invention relates to electrical cable enclosures and more particularly to telephone and electrical power cable enclosures for use in protecting utility cables in the above-ground transition between underground conduit and aerial transmission lines.

2. Description of the Prior Art

The term riser is used in the utility industry to refer to the section of electrical cable (telephone or power) that comes from underground conduit and extends up utility poles or buildings. In most locales, risers must be enclosed by means of conduit (pipe) or U-shaped enclosures usually to a height of 8 feet above ground level. Riser guards (also called cable guards) protect electrical cables from vandalism and rodent damage. In all cases, the material used for such riser guards is either polyvinyl chloride (PVC) plastic or metal (usually steel). The advantage of using a U-shaped guard as opposed to enclosed conduit is that access to the riser can be made by removing the U-shaped guard. From the standpoint of maintenance, this is an important feature. Conduit, because it totally encases the cable, restricts this access. For this reason, most telephone companies prefer the use of U-shaped guards. Whereas, power companies usually use conduit because power companies do not require access to the electrical cable as often as most telephone companies.

The performance requirements including crush and impact resistance and other standards for utility riser guards are specified by state Public Utilities Commissions (PUC's). Most PUC standards require that metal riser guards must be grounded to earth for basic safety reasons. Grounding of metal guards helps prevent an individual from being electrocuted by inadvertent contact with an electrically energized guard.

Some state PUC's have approved the use of an all dielectric U-shaped guard. Nonmetallic guards do not require grounding since dielectric materials do not conduct electricity. However, there are also very stringent electrical and mechanical requirements placed on the use of dielectric guards. For example, the California PUC stipulates that the crush and impact resistance of any U-shaped guard must be equal to or greater than two and one half (2½) inch round schedule 80 PVC conduit as specified in the "National Electrical Manufacturers Association" (NEMA) Standards Publication No. TC 2-1978, paragraph TC 2-3.02 (crushing resistance) and TC 2-3.04 (impact resistance). There are no dielectric U-shaped guards on the market today that comply with the aforementioned NEMA standards. In most situations telephone companies need the flexibility provided by U-shaped riser guards, and therefore, telephone companies use the metallic U-shaped riser guards and suffer the inconvenience of grounding the enclosure.

Thus, what is desired is a dielectric U-shaped cable guard that will meet or exceed the stringent impact and crush resistance NEMA standards of the industry.

In addition, what is desired is a dielectric U-shaped cable guard that will closely interface with a variety of buried conduit sizes to keep water and foreign debris out of the buried cable conduit.

SUMMARY OF THE INVENTION

The present invention provides a dielectric U-shaped cable guard design that will meet or exceed the NEMA strength standards referred to hereinabove. The riser guard is composed of a synthetic resin material reinforced preferably with glass fibers with a thickness greater than ¼". The guard includes a channel-shaped open-ended elongated body having a rounded bottom portion and two side-wall portions. Mounting tabs are molded to the outer-edge of the side-walls to secure the cable guard to an above ground structure such as a building or a utility pole. The footing of the guard has a unique shape to allow proper fitting to a round supply conduit so as to eliminate a reducer cap which would normally be used. The footing which is integrally molded to one end of the channel body comprises a plurality of axial steps extending longitudinally from the channel body end for mating with electrical conduits of different diameters. Trimming the footing at the appropriate step adapts to the guard to receive supply conduits having the most commonly used sizes.

The cable guard design hereinabove described is relatively inexpensive to fabricate, very easy to install, saves telephone companies money by avoiding costly repairs to cables encased in metal pipe, and perhaps more importantly, will minimize the loss of goodwill of telephone customers when defective riser lines need repair.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

For a better understanding of the subject invention, reference is made to the following description and appended claims in conjunction with the above-described drawings.

Figure 1:
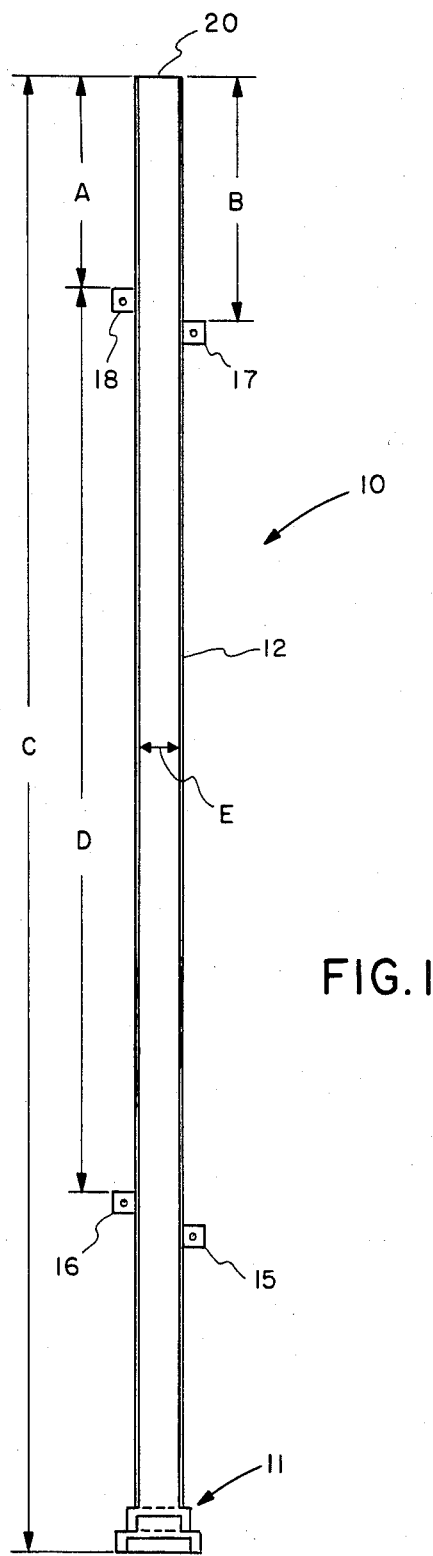
FIG. 1 is a rear plan view of one embodiment of the cable guard illustrating the present invention.

Referring now to FIG. 1, depicted therein is a novel utility cable riser guard 10. Guard 10 includes a U-shaped channel 12 composed of a reinforced synthetic resin material such as a fiberglass laminate. As will be described in more detail hereinafter, channel 12 is mounted to a utility pole, building, or other permanent structure (not shown) with attachment tabs 15–18. The bottom portion 11 of the channel 12 consists of a plurality of concentric steps or lips molded to the channel itself. Its function is to interface the channel with a variety of different size underground conduits.

Figure 2:
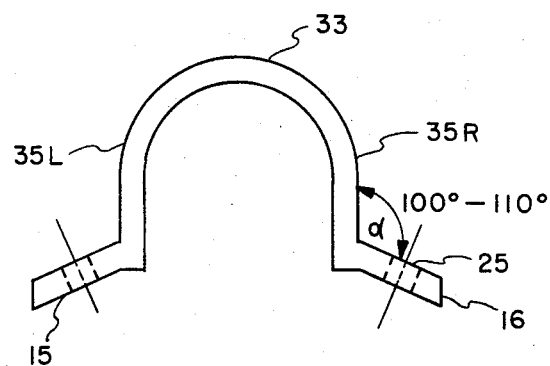
FIG. 2 is a top end view of the embodiment of the cable guard illustrated in FIG. 1 with the bottom footing cut away.

Referring now to FIG. 1, a rear plan view, and to FIG. 2, a top view, channel 12 has a rounded bottom portion 33 and two side-wall portions 35L and 35R. The composition of the channel and its thickness are an important aspect of the invention. After testing many different materials having good dielectric constants of varying thicknesses, I discovered that the only dielectric material that would meet the aforementioned NEMA specification is a synthetic resin material specially reinforced with glass fibers (optionally carbon or boron fibers would also work). Most fiberglass laminate applications use wall thicknesses of less than ¼ inch. For this application and to meet the aforementioned NEMA specification, it is necessary to use additional mat laminations so that the overall thickness exceeds ¼ inch and preferably has a ⅜ inch nominal thickness. The manufacturing process is more stringent than that of most fiberglass plastic products. Again the reason for this is to comply with the aforementioned NEMA strength specification.

The manufacturing process begins with a mold of appropriate dimensions; for most applications the channel length C exceeds 8 feet and the width E is less than 5 inches. A gel coating of suitable color is optionally applied to the entire inner surface of the mold. Next the glass lamination process begins. This process consists of five (5) layers of three (3) ounce mat material, and two (2) layers of six (6) ounce glass cloth material. Each is bonded/laminated together with a standard polyester resin. Subsequent to the gel coat process the first layer of mat material is applied/formed into the mold and saturated with polyester resin. A second layer of mat material is then applied in the same manner over the first layer and is also saturated with standard polyester resin. Subsequent to the second layer of mat material being applied, one (1) layer of glass cloth material is applied over the prior two (2) layers of mat material. The next two (2) layers of material applied are that of mat, and are formed and saturated with polyester resin in the same manner as all previous layers of materials. Following these two layers of mat material, one (1) additional layer of glass cloth should be applied and also saturated with polyester resin. One (1) final layer of mat material is applied/formed in the same manner as all previous layers.

To accommodate a wide variety of riser cables and buried cable conduits, it is preferable to used cable guards of different inside width dimensions (E in FIG. 1). Inside dimensions of 1" to 5" would accommodate almost every application. It is desirable to use the smallest possible cable guard particularly for the utility pole application so that a plurality of cable guards can be used on the same pole.

The mounting tabs 15–18 are depicted in FIG. 1 as four simple square-shaped flanges extending from the channel side-walls 35L and 35R. Any number of such mounting tabs with a great variety of different shapes and thicknesses could be molded to the channel to serve as a means to secure the guard to an above ground permanent structure (not shown). Flanges with multiple bores could also be used so long as their is no conflict with mounting flanges on the opposite side walls as will be explained hereinbelow. FIG. 2, an end view of the channel, illustrates the size and shape of tabs 15–18 somewhat more clearly. Mounting tab 16, depicted in FIG. 2, has a bore 25 to accommodate a lag screw or bolt. This unique feature eliminates the need for mounting hardware, such as clamps or straps. The angle of extension that the tab 16 makes with the sidewall 35R (35L) may be an obtuse angle of 100°–100° as shown or may be a right angle. A 90° angle would be used for attachment to a flat surface, such as the face of a building. The obtuse angle would be functionally superior for curved surfaces, such as a utility pole.

Another unique feature of the guards is the positioning of mounting tabs 15–18 at staggered nonsymmetrical locations along the edge of both side-walls as is depicted in FIG. 1. Dimension A is not equal to B, and D is greater than B−A plus the width of a mounting tab. Because mounting tabs 15–18 are staggered, the mounting tabs of one guard do not conflict with the tabs of an adjacent guard, meaning that two riser guards may be placed side by side with a separation equal to the width of one mounting tab.

Figure 3:
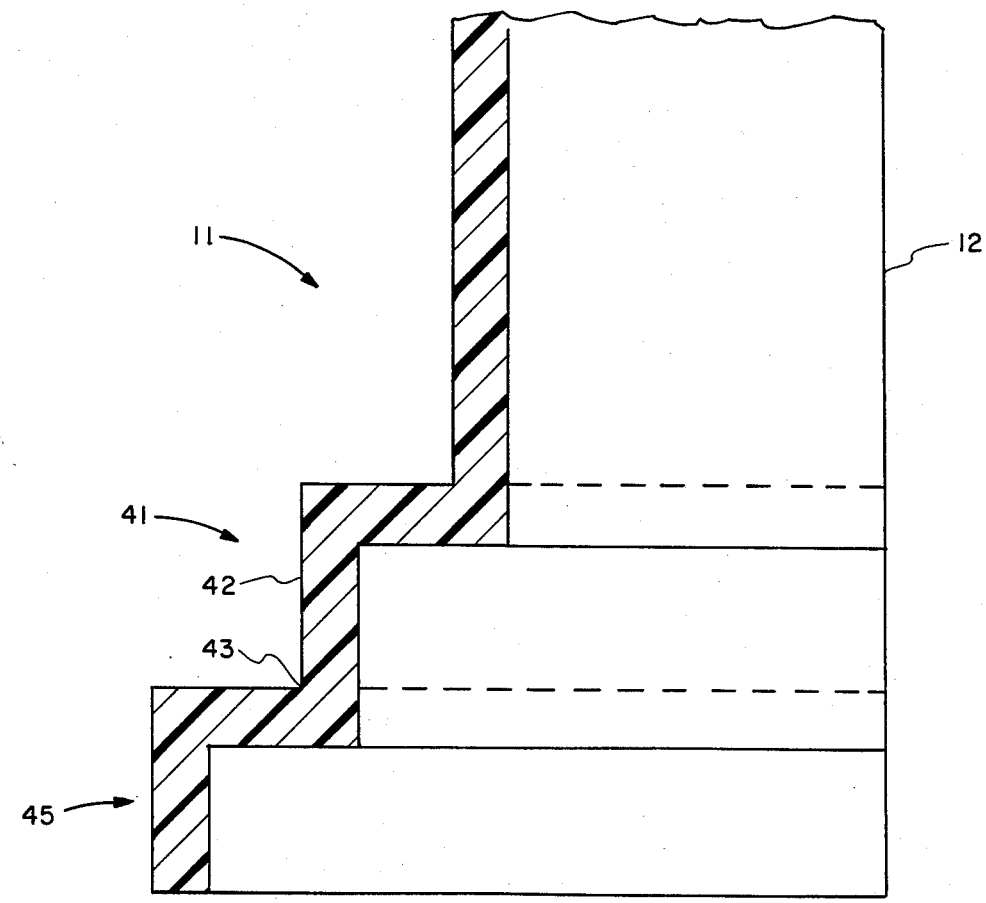
FIG. 3 is an enlarged view illustrating the left half portion of the bottom section of the embodiment of the cable guard illustrated in FIG. 1.

Another unique feature of the guards is the stepped footing of channel 11. Referring to FIG. 3, the footing is shown with two rectangular steps or lips whose purpose is to overlap and adapt to the end section of a main supply conduit. If the diameter of the mating conduit is much larger than the diameter of the channel (dimension E shown in FIG. 1), the outer lip 45 would extend over the outer end of the mating conduit (not shown). If the diameter of the mating conduit is just slightly larger than dimension E, the inner lip 41 would extend over the outer end of the mating conduit and the bottom step 45 could be removed by trimming the channel with a saw at edge 43. In a preferred embodiment three steps are incorporated into the bottom footing to accommodate a larger variety of mating conduits which eliminates the need for a reducer cap which would normally be used. Since the cable guard itself is securely affixed to a permanent structure with the mounting tabs, there is no need to further attach the footing to the mating conduit; however, there are numerous materials that could be used (rubber washers, cements, glues, etc.) to seal or permanently affix the two surfaces.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An electrically non-conductive utility cable riser guard for use in connection with an above ground structure, said guard comprising:
   a channel-shaped open-ended elongated body having a rounded bottom portion and two side-wall portions, said body being composed of a glass fiber reinforced synthetic resin material having an overall thickness greater than ¼";
   attachment means for securing said body to an above ground structure, said attachment means comprising a plurality of flat tabs integral to and extending from the outer edge of each side-wall portion; and
   a stepped footing integrally molded to one end of said body and comprising a plurality of concentric steps extending longitudinally from said body for mating with electrical conduits of different diameters.

2. A cable riser guard as in claim 1 wherein said body thickness is greater than ¼" and less than ½".

3. A cable riser guard as in claim 2 wherein each of said tabs extends at an angle >90° from said outer edge on each side-wall portion and each of said tabs has a bore hole to accommodate a mounting bolt.

4. A cable riser guard as in claim 3 wherein said tabs are positioned along the length of said elongated body at staggered locations.

5. A cable riser guard as in claim 4 wherein said tab extension angle is between 100° and 110°.

6. A cable riser guard as in claim 4 wherein said concentric steps are three in number.

7. An electrically non-conductive utility cable guard comprising:
a substantially U-shaped open-ended channel having a rounded bottom portion and two side portions, said channel being formed of a glass-fiber reinforced polyester synthetic resin material having an overall thickness of from ¼" to ⅜";
means for mounting said channel to an accommodating surface, said means for mounting being integrally molded to and extending at an angle >90° from the outer edge of each side portion and comprising a plurality of short flanges each having an aperture therethrough;
means for axially interfacing one end of said channel with electrical conduit, said means for axially interfacing being integrally molded to one end of said channel and having a plurality of stepped lips extending axially and radially away from said channel.

8. A utility cable guard as in claim 7 wherein said channel thickness is ⅜".

9. A utility cable guard as in claim 8 wherein said flanges are positioned along the length of said channel at staggered locations.

10. A utility cable guard as in claim 9 wherein said stepped lips are three in number.

11. A utility cable guard as in claim 7 wherein said extension angle is between 100° and 110° to accommodate attachment to utility poles.

12. A removable crush resistant electrically nonconductive utility cable guard for use in connection with an above ground structure for protecting above ground utility cables at the entry point to underground conduits, said guard comprising:
a substantially U-shaped open-ended elongated body having a longitudinal axis and also having a rounded bottom portion and two side-wall portions, said body being composed of glass fiber reinforced synthetic resin material having an overall nominal thickness of ⅜";
attachment tab means integrally molded to the outer edges of said side-wall portions at an obtuse angle and comprising at least two tabs on each side-wall portion positioned along the length of said elongated body at staggered locations, each of said tabs further comprising a perforation to accommodate a mounting bolt for securing said body to an above ground structure; and
coupling means integral with said body at one end thereof and extending axially therefrom, said coupling means comprising a plurality of concentric steps aligned with said body for receiving during installation conduits of different diameters.

* * * * *